US012749029B2

(12) United States Patent
Murali et al.

(10) Patent No.: US 12,749,029 B2
(45) Date of Patent: Sep. 29, 2026

(54) ONLINE OPERATING MODE TRAJECTORY OPTIMIZATION FOR PRODUCTION PROCESSES

(71) Applicant: International Business Machines Corporation, Armonk, NY (US)

(72) Inventors: Pavankumar Murali, Ardsley, NY (US); Dharmashankar Subramanian, White Plains, NY (US); Nianjun Zhou, Danbury, CT (US); Xiang Ma, Vancouver (CA); Jacqueline Williams, Calgary (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1821 days.

(21) Appl. No.: 16/507,688

(22) Filed: Jul. 10, 2019

(65) Prior Publication Data

US 2021/0012190 A1 Jan. 14, 2021

(51) Int. Cl.
*G06N 3/08* (2023.01)
*G06F 17/18* (2006.01)
(Continued)

(52) U.S. Cl.
CPC ............. *G06Q 10/04* (2013.01); *G06F 17/18* (2013.01); *G06N 3/044* (2023.01)

(58) Field of Classification Search
CPC ........ G06N 3/08; G06N 3/0445; G06N 20/00; G06N 5/003; G06N 3/044–045;
(Continued)

(56) References Cited

U.S. PATENT DOCUMENTS 6,609,036 B1 8/2003 Bickford
6,721,609 B1 4/2004 Wojsznis et al.
(Continued)

FOREIGN PATENT DOCUMENTS

EP 1035253 A1 9/2000

OTHER PUBLICATIONS

Shao et al., Decision Guidance Methodology for Sustainable Manufacturing Using Process Analytics Formalism, 2017, J Intell Manuf (2017) 28, pp. 455-472 (Year: 2017).*
(Continued)

*Primary Examiner* — Kakali Chaki
*Assistant Examiner* — Johnathan R Germick
(74) *Attorney, Agent, or Firm* — James Olsen, Esq.; Heslin Rothenberg Farley & Mesiti P.C.; George S. Blasiak, Esq.

(57) ABSTRACT

An apparatus and method for optimizing a process, including: receiving live operational data associated with a plurality of sub-processes of a process; selecting a pre-trained regression model from a plurality of pre-trained regression models for each sub-process of the plurality of sub-processes; generating a system-wide optimization model including a multi-period mathematical program model, including: one or more decision variables; a plurality of constraints, wherein: a first constraint of the plurality of constraints comprises one of the pre-trained regression models, and a second constraint of the plurality of constraints comprises an operational constraint; and an objective function; generating, via the optimization model, an operating mode trajectory including a plurality of intermediate operating modes at a plurality of intermediate times during a planning interval; and displaying a set-point trajectory recommendation in a graphical user interface based on the operating mode trajectory.

20 Claims, 6 Drawing Sheets

(51) Int. Cl.
*G06N 3/044* (2023.01)
*G06Q 10/04* (2023.01)

(58) Field of Classification Search
CPC ........... G06N 5/01; G06F 17/18; G06F 17/11; G06Q 10/04; G06Q 50/04; Y02P 90/30; Y02P 90/03
See application file for complete search history.

(56) References Cited

U.S. PATENT DOCUMENTS

| | | | | |
|---|---|---|---|---|
| 7,085,615 | B2 | 8/2006 | Persson et al. | |
| 8,055,358 | B2 | 11/2011 | Blevins et al. | |
| 9,904,257 | B2 | 2/2018 | Thiele | |
| 2003/0083757 | A1 * | 5/2003 | Card | G05B 13/027 700/36 |
| 2005/0193739 | A1 | 9/2005 | Brunell et al. | |
| 2010/0306001 | A1 | 12/2010 | Discenzo et al. | |
| 2011/0130850 | A1 | 6/2011 | Zheng et al. | |
| 2011/0301723 | A1 | 12/2011 | Pekar et al. | |
| 2016/0362838 | A1 | 12/2016 | Badwe et al. | |

OTHER PUBLICATIONS

Qin et al., A Survey of Industrial Model Predictive Control Technology, 2003, Control Engineering Practice 11, pp. 733-764 (Year: 2003).*

Longhao Gong et al., Application of Hybrid Integrated Model Based on Mechanism Model Residuals in Fiber Production Melt Conveying, Jul. 5-7, 2019, 2019 CAA Symposium on Fault Detection, Supervision and Safety for Technical Processes (SAFEPROCESS), Xiamen, China, pp. 339-343 (Year: 2019).*

Chew et al., Computer-Aided Knowledge-Based Monitoring and Diagnostic System for Emulsion Polymerization, Oct. 2007, Trans IChemE, Part A, 2007 Institution of Chemical Engineers, vol. 85 (A10), pp. 1436-1446 (Year: 2007).*

Weiyuan Liu, "Natural user interface- next mainstream product user interface," 2010 IEEE 11th International Conference on Computer-Aided Industrial Design & Conceptual Design 1, Yiwu, China, 2010, pp. 203-205, doi: 10.1109/CAIDCD.2010.5681374. (Year: 2010).*

M. Zambelli and Y. Demirisy, "Online Multimodal Ensemble Learning Using Self-Learned Sensorimotor Representations," in IEEE Transactions on Cognitive and Developmental Systems, vol. 9, No. 2, pp. 113-126, Jun. 2017, doi: 10.1109/TCDS.2016.2624705. (Year: 2017).*

J. Ding, H. Modares, T. Chai and F. L. Lewis, "Data-Based Multiobjective Plant-Wide Performance Optimization of Industrial Processes Under Dynamic Environments," in IEEE Transactions on Industrial Informatics, vol. 12, No. 2, pp. 454-465, Apr. 2016, doi: 10.1109/TII.2016.2516973 (Year: 2016).*

Authors et. al.: Disclosed Anonymously, "Machine Learning Algorithms for Smart Meter Diagnostics," IP.com No. IPCOM000242462D | IP.com Electronic Publication Date: Jul. 16, 2015 | 53 pages.

Authors et. al.: Disclosed Anonymously, "Anticipatory Product Development Using Design Suggestions," IP.com No. IPCOM000252104D | IP.com Electronic Publication Date: Dec. 15, 2017 | 34 pages.

Authors et. al.: Disclosed Anonymously, "System and method for efficient operations of wastewater treatment plants through monitoring, modeling, prediction and optimization," IP.com No. IPCOM000237571D | IP.com Electronic Publication Date: Jun. 25, 2014 | 15 pages.

Lujia Feng, "Manufacturing System Energy Modeling and Optimization," Clemson University, May 2016, 251 pages.

Alberto Bemporad, "Reference Governors: On-Line Set-Point Optimization Techniques for Constraint Fulfillment," Dipartimento di Sistemi e Informatica, Oct. 1997, 169 pages.

Kulhavy et al., "Emerging Techniques for Enterprise Optimation in the Process Industries," 1998, 12 pages.

M. G. Na and B. R. Upadhyaya, "Model Predictive Control of an SP-100 Space Reactor Using Support Vector Regression and Genetic Optimization," in IEEE Transactions on Nuclear Science, vol. 53, No. 4, pp. 2318-2327, Aug. 2006, doi: 10.1109/TNS.2006.876517. [Abstract Only].

Xi et al., "Support vector regression model predictive control on a HVAC plant," Control Engineering Practice, vol. 15, Issue 8, Dated Aug. 2007, pp. 897-908 [Abstract Only].

* cited by examiner

ONLINE OPERATING MODE TRAJECTORY OPTIMIZATION FOR PRODUCTION PROCESSES

BACKGROUND

The present invention relates to modeling of complex processes, and more specifically, to a scalable prediction-optimization framework for modeling complex processes.

The behavior of complex processes found in manufacturing plants, chemical plants, oil refineries, and other process industries are difficult to model due to inherent complexity and lack of scalable optimization models. Consequently, modeling of complex processes is conventionally limited to modeling and optimizing sub-processes within the overall process, such as one step of a manufacturing process, or one unit within a manufacturing plant. Process-wide optimization is rarely attempted.

Accordingly, there is a need for a scalable prediction-optimization framework for modeling transient behavior of complex processes in the aggregate, such as across the entire span of a manufacturing process.

SUMMARY

According to one embodiment of the present invention, a method for optimizing a process, comprises: receiving live operational data associated with a plurality of sub-processes of a process; selecting a pre-trained regression model from a plurality of pre-trained regression models for each sub-process of the plurality of sub-processes; generating a system-wide optimization model comprising a multi-period mathematical program model, including: one or more decision variables; a plurality of constraints, wherein: a first constraint of the plurality of constraints comprises one of the pre-trained regression models, and a second constraint of the plurality of constraints comprises an operational constraint; and an objective function; generating, via the optimization model, an operating mode trajectory comprising a plurality of intermediate operating modes at a plurality of intermediate times during a planning interval; and displaying a set-point trajectory recommendation in a graphical user interface based on the operating mode trajectory.

According to another embodiment of the present invention, a system, comprises: a memory comprising computer-executable instructions; and a processor configured to execute the computer-executable instructions and cause the system to: receive live operational data associated with a plurality of sub-processes of a process; select a pre-trained regression model from a plurality of pre-trained regression models for each sub-process of the plurality of sub-processes; generate a system-wide optimization model comprising a multi-period mathematical program model, including: one or more decision variables; a plurality of constraints, wherein: a first constraint of the plurality of constraints comprises one of the pre-trained regression models, and a second constraint of the plurality of constraints comprises an operational constraint; and an objective function; generate, via the optimization model, an operating mode trajectory comprising a plurality of intermediate operating modes at a plurality of intermediate times during a planning interval; and display a set-point trajectory recommendation in a graphical user interface based on the operating mode trajectory.

According to another embodiment of the present invention, a non-transitory computer-readable storage medium comprises computer-readable program code that, when executed by one or more computer processors of a processing system, cause the processing system to perform a method of optimizing a process, the method comprising: receiving live operational data associated with a plurality of sub-processes of a process; selecting a pre-trained regression model from a plurality of pre-trained regression models for each sub-process of the plurality of sub-processes; generating a system-wide optimization model comprising a multi-period mathematical program model, including: one or more decision variables; a plurality of constraints, wherein: a first constraint of the plurality of constraints comprises one of the pre-trained regression models, and a second constraint of the plurality of constraints comprises an operational constraint; and an objective function; generating, via the optimization model, an operating mode trajectory comprising a plurality of intermediate operating modes at a plurality of intermediate times during a planning interval; and displaying a set-point trajectory recommendation in a graphical user interface based on the operating mode trajectory.

DETAILED DESCRIPTION

Figure 1:
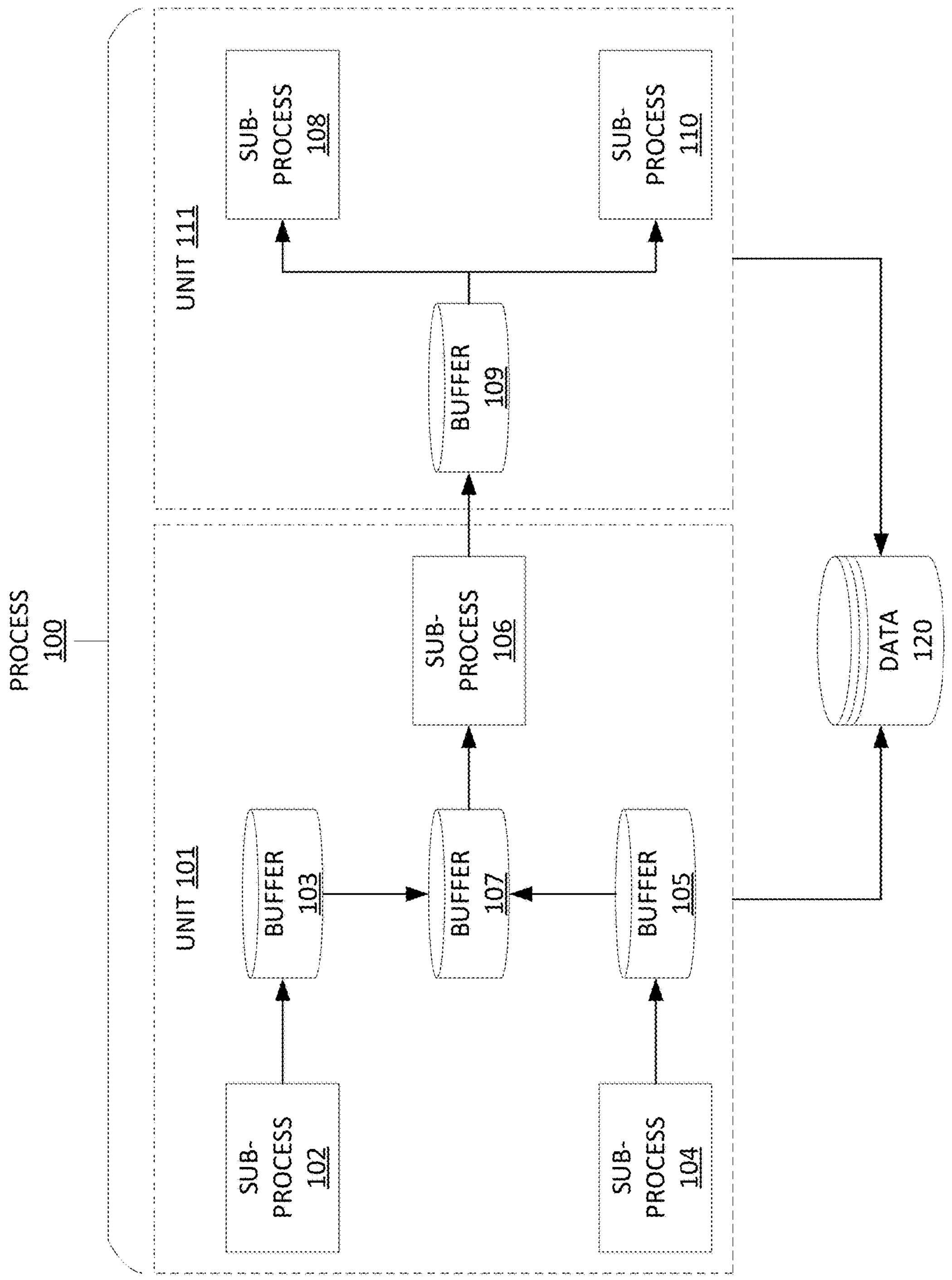
FIG. 1 depicts an example graphical representation of a process.

Described herein are methods and systems for performing process-wide (also referred to as system-wide or site-wide) optimization of complex processes. In embodiments described herein, regression models are used to model sub-processes and then embedded into a process-wide optimization model to identify operating mode trajectories that minimize a multi-objective optimization function. The resulting prediction-optimization framework may be used to describe and optimize complex process behaviors, such as the behavior of a manufacturing plant in a process industry like a paper mill, chemical plant, or an oil refinery, to name just a few examples.

In some embodiments, each regression model in the prediction-optimization framework may correspond to a sub-process of an overall process, such as a particular unit in a manufacturing plant. The regression models may be static behavior models (e.g., for steady-state sub-processes) or transient behavior models (e.g., for dynamic sub-processes) depending on the underlying characteristics of the sub-process.

In the context of a manufacturing plant, for example, each regression model in the prediction-optimization framework may model the relationship between one or more set-point controls (e.g., for equipment performing a sub-process), observed sub-process variables (e.g., regarding operational conditions of the sub-process, or uncontrollable environmental conditions), and sub-process output variables (e.g., regarding outputs from the sub-process). The regression models may be based on time-series data captured through, for example, sensors monitoring sub-process operations. For example, a manufacturing plant may have many sensors monitoring aspects of all equipment performing sub-processes, all intermediate infrastructure, and all outputs of sub-processes as well as the overall process, to name a few examples.

In some embodiments, the prediction-optimization framework may embodied in a directed acyclic graph. In such a graph representation, nodes in the graph may represent sub-processes modeled via regression functions and buffers (e.g., inventory or flow buffers). The edges of the graph may represent, for example, material flow volumes, qualities, compositions, etc. In this manner, globally optimal set points (e.g., optimized operating modes) for each sub-process may be determined such that a solution is determined that is feasible for both upstream and downstream nodes in the graph.

In some embodiments, the prediction-optimization framework is configured to determine a starting operating mode of a process and then determine operating mode set points over a time horizon, which may be referred to as an operating mode trajectory. In some embodiments, the prediction-optimization framework determines an operating mode for each sub-process and then an operating mode for the whole process based on the sub-process operating modes. For example, the sub-process operating conditions, such as that determined by a combination of controllable and observed variables, may be compared to pre-determined operating mode clusters to determine a current operating mode.

In some embodiments, a feedback loop triggers automatic prediction model retraining based on either process "upsets" or when the quality of the prediction model has degraded. For example, when the realized performance of a sub-process diverges from its modeled behavior, the prediction-optimization framework may select a new prediction model that matches the current operating mode of the sub-process. In some examples, the divergence may be caused by a condition with a sub-process, such as an equipment failure, or change in upstream condition that affects the sub-process, such a lack of material input.

The prediction-optimization framework described herein has many advantages over conventional practices. For example, the prediction-optimization framework described herein utilizes operating mode trajectory optimization, which improves scalability and tractability of optimization models, such as mixed-integer linear programs (NP-hard), by using fewer integer variables and by attempting local optimization, such as within an operating mode cluster. The prediction-optimization framework described herein is configured to recommend an optimal (or near-optimal) operating mode trajectory for the entire system with individual sub-process controls that are compatible with each other and with a current or desired operating mode.

Further, the use of a time-indexed directed acylic graphical representation of a process (including all of its constituent sub-processes) offers a generalizable structure that can be easily adapted to different processes, constraints, and objectives through manipulation of input files to the prediction-optimization framework.

Further yet, the prediction-optimization framework described herein is capable of providing optimal mode trajectories under both normal and upset scenarios, where an upset may occur within any sub-process (e.g., within any unit of a manufacturing plant). Under an upset scenario, the prediction-optimization framework provides a recommendation (e.g., from an optimizer) that minimizes disruptions to downstream operations.

Example Process Flow

FIG. 1 depicts an example graphical representation of a process 100. Process 100 may relate to, for example, a process for manufacturing a product in a manufacturing plant, or a process for refining a material in a processing plant, or the like. Generally, production processes in manufacturing and process industries comprise a sequence of complex sub-processes, each with a set of inputs and output(s). For example, in the oil and gas industry, mined ore may be passed through several stages of extraction and upgrading, where each stage is self-contained and the output from an upstream sub-process becomes an input for a downstream sub-process.

In the depicted example, process 100 includes two units 101 and 111, which each may be associated with a subset of sub-processes of the overall process 100. Each sub-process may, for example, be associated with separate physical aspects of a processing plant, such as different sets of machinery or equipment for performing different sub-processes and creating different aspects of end products.

In the depicted example, each sub-process (e.g., 102, 104, 106, 108, and 110) may be associated with a self-contained set of inputs (e.g., raw materials), set-points for the process (e.g., processing parameters, such as temperature and time), observed variables (e.g., flow rates), and outputs (e.g., processed materials, sub-components, waste, etc.). Within a sub-process, there may be a transient relationship (e.g., time-dependent) between the various set-points and the outputs, such as throughput and quality of the desired output and the resulting flow of waste in a manufacturing process. Self-contained sub-processes, such as 102, 104, 106, 108, and 110, and their associated inputs, outputs, and observed variables may be identified and modeled (e.g., to form a process flow diagram like FIG. 1) based on, for example, subject matter expert inputs, a knowledge graph framework, or by other means.

Outputs for various sub-processes, such as sub-process 102, may be stored in buffers, such as buffer 103, which may then be used as an input for other sub-processes. Buffers may be associated with physical storage devices in a processing or manufacturing plant, such as a tank for a fluid, or a shelf for sub-components, or the like. In some cases, multiple buffers may be inputs for another sub-process, such as buffers 103 and 105 are inputs to buffer 107, which is an input for sub-process 106.

Data may be collected from sub-processes and buffers (e.g., from sensors) and stored in a data store, such as data store 120. The data collected from sub-processes may include, for example, operational parameters associated with any machinery used with a specific sub-process, as well as various other sorts of sensors readings (e.g., status, temperature, input speed, output speed, flow rates, error indications, power use, wear indications, vibrations, quality, etc.). Likewise, the data collected from buffers may include, for example, operational parameters associated with any machinery used with a specific buffer, as well as various other sorts of sensors readings, such as those described above.

The combination of all of the sub-processes across process 100 (e.g., in units 101 and 111 in this example) may collectively be referred to as a site-wide process in some examples.

Process 100 is highly dynamic and difficult to optimize due to, for example, time-variant operational requirements, complex dependencies, breakdowns and maintenance, changes in production plans, etc. This is why conventional process optimization techniques have focused on sub-process specific optimization rather than process-wide optimization. Consequently, conventional optimization techniques fail to address the complex relationships between the various inputs and output(s) in a process-wide context. They may be also limited in their capability to capture operating mode-dependent behavior, which is captured better through data-driven models instead of first-principle based models. By contrast, the systems and methods described in more detail below present an improvement to conventional optimization techniques and allow modeling for each sub-process to be aggregated in a process-wide prediction-optimization framework.

Example Prediction-Optimization Framework

Figure 2:
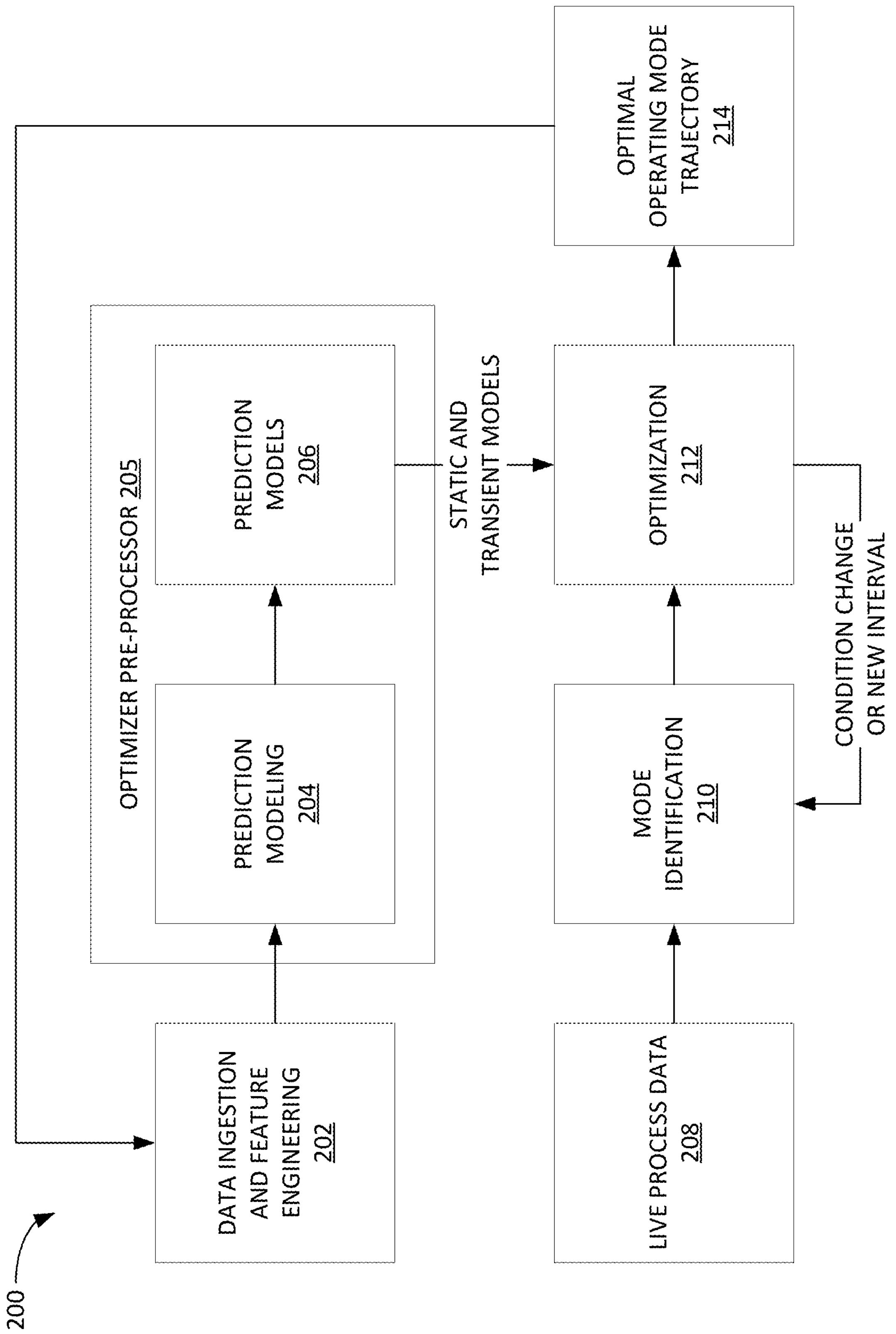
FIG. 2 depicts an example prediction-optimization framework.

FIG. 2 depicts an example prediction-optimization framework 200.

Framework 200 includes a data ingestion and feature engineering process 202. Data may be ingested from, for example, sensors associated with sub-processes, buffers, and any other monitored aspects of a process, such as described above with respect to FIG. 1. The data may be time-series data that includes the values from sensors over time.

Generally, feature engineering is the process of creating features (also referred to as predictor variables or independent variables) from the ingested data, which may generally improve the data's usability for machine learning algorithms. In some cases, features are created using domain knowledge of the data, while in other cases features are generated according to various numerical and categorical methods, feature creation heuristics, and feature detection algorithms.

For example, feature engineering may include imputation, which is the process of determining or imputing values for missing data in an input data set. The missing data may be imputed by numerical methods, such as statistical methods (e.g., mean or median value), or categorical imputation (e.g., maximum or minimum occurred value). As another example, missing values may be imputed based on a local interpolation such as smoothing splines or wavelets.

Feature engineering may also include creating new variables based on existing variables, such as interaction variables. Interaction variables may represent the same information, with fewer features, which may improve model performance. As another example, dummy variables may be created in place of non-numeric categorical variables. In some cases, rather than creating new variables, existing variables may be eliminated if their data is sparse or otherwise not useful to the model.

Feature engineering may also include outlier detection and resolution. For example, outliers may be determined by manual analysis (e.g., visual analysis) or numerical methods, such as standard deviations or percentiles. Outliers may be dropped in some implementations, or capped in other implementations. For example, very high values in a suitably chosen interval may be clipped to the 99-percentile value of that interval.

Feature engineering may also include binning, which may improve the robustness of a model and prevent overfitting through a determined degree of regularization. For example, ranges of numerical values may be reduced to a relatively smaller number of categorical bins, or categorical values may be consolidated into fewer, broader category bins.

Feature engineering may also include transformations, such as a log transform, which better handle skewed data and reduce the negative effects of outliers.

Feature engineering may also include, encoding, such as one-hot encoding, which spreads the value in a single features to multiple features. So, for example, a categorical feature may be split into multiple features and assigned simple binary values (e.g., 0's or 1's) depending on the original categorical feature.

Feature engineering may also include scaling, such as normalization (e.g., min-max normalization) and standardization (e.g., z-score normalization).

Notably, these are just a few examples of feature engineering, and other sorts of feature engineering and pre-processing are possible.

Framework 200 also includes prediction modeling process 204, which is the process of creating models for the various sub-processes of an overall process, such as a site-wide process (e.g., as discussed above with respect to FIG. 1). In some embodiments, the prediction models are machine learning models.

In particular, each sub-process may be modeled with a regression model of a specific type depending on the nature of the sub-process, such as a static behavior model or a transient behavior model, as described in more detail below with respect to FIG. 3.

Generally, a static or steady-state behavior model (e.g., Y=f(x)) may be built from sample data taken as a single snapshot, e.g., the joint values of process variables taken over the same common time period. A transient or dynamic behavior model (e.g., $Y_t=f_t(x_t)$), on the other hand, uses variable values from previous time periods to capture the historical dependence in the sample data. In some cases, if transient changes in process variables happen faster than the time scale of optimization, a static behavior model may generally suffice.

In some embodiments, sub-processes and processes may be analyzed to determine whether they have multiple distinct operating modes. For example, it is common for industrial plants to operate at different levels of throughput due to maintenance downtime, shift changes, or other economic reasons.

When modeling sub-processes, variables or features may be selected for inclusion in a regression model beyond the basic inputs and outputs (e.g., material inflows and outflows in a manufacturing sub-process). For example, upstream variables from another sub-process or other variables related to processing conditions (e.g., variables like temperature, pressure, etc.) may be included in a regression model. Generally, variable selection and feature engineering (as discussed above) may be beneficially employed when modelling sub-processes while controlling for multicollinearity (or collinearity), which is the condition in which a feature or variable in a multiple regression model can be linearly predicted from others variables with a substantial degree of accuracy.

In some embodiments, relationships in the regression model (e.g., inflows to a sub-process and outflows from the sub-process) may be modeled on the same time scale chosen for optimization. In some cases, this may require manipulation of the sample data to match time scales. For example, when sensor data is collected at a finer frequency (e.g., every 5 minutes) than the look-ahead optimization timescale (e.g., every hour), the training data for the regression model (e.g., sensor data) may be aggregated to the coarser time scale using statistical methods, such as the estimated mean or median.

Generally, prediction modeling process 204 generates a plurality of regression models for each sub-process based on the data ingested in process 202, where each regression model associated with a sub-process is of a different type. Example model types include regression trees, multivariate adaptive regression splines (MARS), simple linear regressions, segmented or piece-wise linear regressions, and non-linear neural networks, to name a few examples. Depending on whether a static behavior model suffices or not, as described above, the chosen model could also be in the form of a static linear model, a dynamic linear model, like an autoregressive integrated moving average (ARIMA), or a nonlinear dynamic model, like a long short-term memory (LSTM) neural network. Further, in some embodiments, prediction modeling process 204 generates different regression models for each operating mode associated with a sub-process. The different regression models associated with different operating modes for a sub-process may be of different types, such as just described.

The output of prediction modeling 204 in framework 200 are prediction models 206. As described above and in more detail below with respect to FIG. 3, prediction models 206 may include a first subset of static or steady-state behavior models and a second subset of dynamic or transient behavior models. Collectively, prediction modeling 204 and the resulting prediction models 206 may be referred to as an optimizer pre-processor, because the models may be used in the optimization process as described below. Similarly, prediction models 206 may be referred to as pre-processed prediction models.

Live process data 208 is received by prediction-optimization framework 200 for the purpose of process-wide (e.g., optimization across an entire manufacturing process at a manufacturing plant). Live process data may include, for example, data from various sub-processes, buffers, and other process components, such as in-flows, out-flows, operating conditions, settings, etc.

In some embodiments, live process data 208 may be analyzed by prediction-optimization framework 200 for operating mode identification 210. As described above, any sub-process or process may be associated with one or more operating modes, such as, for example, a normal operating mode, a degraded operating mode, an efficiency-optimized operating mode, a throughput-optimized operating mode, and others. An operating mode of a process or sub-process may generally be represented by the state of all process settings (e.g., set-points) associated with that process or sub-process. In some embodiments, the set-points may be stored in a vector data format for ease of use within prediction-optimization framework 200. In some cases, the operating mode of a process or sub-process is time-dependent, that is, the state of set-points may be changed, either manually or through an automated or partially-automated control system, in response to a production requirement or constraints, such as upsets.

For example, in the context of a manufacturing plant performing a manufacturing process, an operating mode may be represented by all of the set-points across the manufacturing plant associated with the process. Similarly, the observed state of all set-points associated with a sub-process or process may be used to determine or predict an operating mode, such as by way of an operating mode prediction algorithm. Note that not all embodiments of prediction-optimization framework 200 need to include mode identification 210.

Framework 200 also includes an optimization process 212, which may be referred to as an optimizer of prediction-optimization framework 200.

Generally, optimization process 212 may construct an optimization model as a multi-period mathematical program with decision variables, constraints, and an objective function. In some embodiments, a multi-objective function is used with weights considered for each objective. Examples of objectives in the context of a manufacturing process include: (1) maximizing throughput volume and/or quality, (2) minimizing deviation from a production plan, (3) maintaining or increasing inventories between sub-processes, and (4) minimizing usage of expensive materials, to name a few examples.

In some embodiments, the mathematical program for the optimization model is a mixed-integer linear program. Generally, an integer programming problem is a mathematical optimization program in which some (mixed-integer) or all of the variables are restricted to be integers, and in which the objective function and the constraints (other than the integer constraints) are linear.

The optimization model may determine optimal set-points, and corresponding optimal operating modes, associated with all sub-processes of a process over a time horizon, such as a planning horizon, and may be referred to collectively as an optimal operating mode trajectory 214.

A mathematical representation of an operating mode trajectory may be defined as follows. Initially, let $x^t \in \mathbb{R}^n$ denote control variables at time t and $$x^t_{m_i}$$

$\in \mathbb{R}^{m_i \times n}$ denote the operating mode at time t for control variable i over all control variables $x^t$. The trajectory of operating modes may then be defined by $$x^1_{m_i}, x^2_{m_i}, \ldots, x^T_{m_i}.$$

The operating modes may further be mapped to predetermined operating mode clusters labeled by the cluster centroids.

For normal operations trajectory optimization, $$x^0_{m_i}$$

may represent the site-wide operating mode at the current time period, and $$x^T_{m_i}$$

may represent the operating mode at time period T, which is the end of the planning horizon. Then, $$x^{t*}_{m_i}$$

for t=1, 2, . . . T−1 may be determined optimally (or near-optimally with an approximation guarantee) to minimize the deviations between $$x^{t*}_{m_i} \text{ and } x^t_{m_i}.$$

For an upset scenario trajectory optimization, the availability of a sub-process might be either partially or completely affected. Hence, from that point in time forward, $$x^t_{m_i}$$

given by the normal process plan would no longer serve as a reference to monitor process-wide operational efficiency. Hence, upon identifying an upset, a new trajectory $$x^{t*}_{m_i}$$

may be optimally (or near-optimally with an approximation guarantee) determined such that deviations in necessary observed variables from desired quantities are minimized.

In some trajectory optimization embodiments, smoothing is applied to recommended set-point trajectories. For example, in process industries, it is not operationally ideal to continually change control variables. Rather, control variables may preferably be changed only once in a shift, or day, or some other planning interval. To handle this requirement, the deviation in $$x_i^t \text{ and } x_i^{t-1}$$

may be penalized if it larger than a threshold or if $$x_i^t \text{ and } x_i^{t-1}$$

belong to two different operating mode clusters. In some cases, the penalty is quadratically proportional to the Euclidean distance between the two values.

In some embodiments of prediction-optimization framework 200, optimization process 212 includes the creation of segmented linear models that are trained using multivariate adaptive regression splines (MARS) or decision trees. For MARS, a linear basis functions may be used thereby resulting in a linear model in each segment. For decision trees, the feature space of inflow variables and non-control covariates may be recursively partitioned in order to train a standard regression tree, and a linear regression model may be trained at each leaf node (segment) in the regression tree.

In some embodiments, the definition of each segment is determined during a training phase of building the MARS model or the regression tree, and the definition is a logical definition based on the linear conditions on the values of the inflow variables and the other non-control covariates. This approach allows the use of binary variables in each time-period for each node, and each corresponding segment to denote whether a logical condition for that segment is active or not. Linear constraints may be added that make the binary (e.g., 0/1) variables consistent with the segment definition.

Optimization model objectives may be defined based on characteristics of a sub-process or process and may relate, for example, to maximizing or minimizing values associated with the sub-process or process over a time interval. For example, in the context of a manufacturing plant, objectives of the optimization model may include: maximizing throughput of final and intermediate products, minimizing deviation of a subset of control and output variables from those specified in the production plan, minimizing disruptions to inventories stored in buffers (e.g., intermediate tanks), and/or minimizing consumption of expensive products. Notably, this is just one example of a set of objectives, and many others are possible.

The following are examples of objective representations that may be used in a mixed-integer linear programming optimization model, where i denotes the index of a flow, $t_1$, $t_2$ represent intermediate storage tanks, b represent time-period, and I and O represent inflow and outflow respectively. Further, $N_B$ denotes the planning horizon.

Maximize throughput across all process flows:

$$\sum_{b=1}^{N_B} \sum_{i\in\phi^{OMax}} f^O_{i,b} W^O_{i,b},$$

where $\phi^{OMax}$ is the set of all process flows.

Minimize inventory changes to maintain safe levels of inventory across tanks:

$$\sum_{b=1}^{N_B} \sum_{t\in\phi^T} W_{t,b} d_{t,b},$$

where $W_{t,b}$ is the weight associated with tank tin time period b and $d_{t,b}$ is deviation of tank tin time period b.

Minimize deviations from a planned trajectory based on a production plan:

$$\sum_{b=1}^{N_B} \sum_{t\in\phi^{OT}} W^{OT}_{t,b} d^O_{t,b},$$

where $$W^{OT}_{t,b}$$

is the weight associated with the outflow of tank t in time period b and $d_{t,b}$ is outflow deviation of tank tin time period b.

Smooth decision variables over planning horizon:

$$\sum_{b=1}^{N_B} \sum_{t\in\phi^I} W^I_{i,b} d^I_{i,b},$$

where $\phi^I$ is the set of all inflows, $$W^I_{i,b}$$

is the weight associated with inflow i in time period b and $d_{i,b}$ is the deviation of inflow i in time period b.

Notably, these are just some examples, and many others are possible based on the process design.

Smoothing can be implemented as a constraint in an optimization model resulting from optimization process 212 so that deviation is limited between variables between time periods. In this way, difficult or impossible changes in actual process variables are not recommended as part of an optimization result. For example, going from a very high temperature as an output material (e.g., a fluid) in a first sub-process to a very low temperature as an input material in a second sub-process may not be practical or feasible over a small period of time. As another example, it might not be operationally practical for the optimization model to recommend that a temperature set point for a sub-process be changed drastically due to thermal inertia, the latency in the control system, and/or other operational constraints.

In some embodiments, optimization model constraints may comprise (1) regression functions that relate input set-points, such as flow rates, temperatures, pressures etc., to outputs such as throughput rate, quality, etc.; (2) lower and upper bounds on decision variables; (3) mass and flow conservations constraints across connections, inventory buffers, flow buffers etc.; and (4) constraints to handle relaxation applied to a subset of decision variables (through slack variables).

The following are examples of constraint representations that may be used in a mixed-integer linear programming optimization model. In addition to the representations above, in the following, $$f_{i,b}^{I} \text{ and } f_{i,b}^{O}$$

denote inflow and outflow rates (respectively) for a unit process i over period b, and $v_{t,b}$ be the inventory level in tank t at the end of period b.

Bounds on decision variables:

$$f_{j,b} \geq F_{i,j}^{min} f_{i,b} \;\&\; f_{j,b} \leq F_{i,j}^{max} f_{i,b} \forall\, b \in 1, \ldots, N_B.$$

Upper and lower bounds on inventory changes between time periods:

$$v_{t,b} \leq v_{t,b-1} + \Delta^U v_t^{max} \;\&\; v_{t,b} \geq v_{t,b-1} - \Delta^D v_t^{max} \forall\, b \in 1, \ldots, N_B.$$

Semi-continuous flow constraints:

$$f_{i,b}^{I} \geq F_i^{Min} \delta_{i,b}^{I0} \text{ and } f_{i,b}^{I} \leq F_i^{Max} \delta_{i,b}^{I0}, \text{ where } \delta_{i,b}^{I0}$$

is a binary variable that it is used for a semi-continuous representation of inflow I.

Flow conservation:

$$v_{t,b} = v_{t,b-1} + \sum\nolimits_{i \in \Phi_t^{IIT}} f_{i,b}^{I} - \sum\nolimits_{i \in \Phi_t^{IOT}} f_{i,b}^{I} + \sum\nolimits_{i \in \Phi_t^{OIT}} f_{i,b}^{O} - \sum\nolimits_{i \in \Phi_t^{OOT}} f_{i,b}^{O}.$$

Regression-tree constraints:

$$f_{i,b}^{O} \leq B_{i,l}^{RT} + \sum\nolimits_{k=1}^{N_i} A_{i,j_k,l}^{RT} f_{j_k,b}^{I} + M\left(2 - \delta_{i,l,b}^{RT} - \delta_{i,b}^{Y\phi}\right) \;\&\; f_{i,b}^{O} \geq B_{i,l}^{RT} + \sum\nolimits_{k=1}^{N_i} A_{i,j_k,l}^{RT} f_{j_k,b}^{I} - M\left(2 - \delta_{i,l,b}^{RT} - \delta_{i,b}^{Y\phi}\right), \text{ where } A_{i,j_k,l}^{RT}$$

is the slope for the linear relation between outflow j and inflow j in leaf node l, and $$B_{i,l}^{RT}$$

is the intercept for the linear relation between outflow j and inflow j in leaf node l.

MARS based constraints:

$$f_{i,b}^{O} \leq B_i^{MA} + \sum\nolimits_{j \in \Phi_i^{MA}} PwlF_{ij}\left(f_{j,b}^{I}\right) + M\left(1 - \delta_{i,b}^{Y0}\right) \;\&\; f_{i,b}^{O} \geq B_i^{MA} + \sum\nolimits_{j \in \Phi_i^{MA}} PwlF_{ij}\left(f_{j,b}^{I}\right) - M\left(1 - \delta_{i,b}^{Y0}\right),$$

where $PwlF_{ij}$ is a piecewise linear function of inflow $$f_j^I$$

and M is a large number.

Notably, these are just some examples, and many others are possible based on the process design.

Optimization process 212 may be restarted based on various events, such as a condition associated with a sub-process changing. For example, a unit of processing equipment may go offline, or into an upset or degraded condition. In the event of a condition change, the optimization process 212 may return to mode identification so that alternate prediction models, that are better reflective of the current process or sub-process behavior, may be selected for the optimization process going forward. Thus, prediction-optimization framework 200 allows for efficient handling of degraded or upset conditions, such as an upset in an upstream process, to minimize disruptions to downstream processes.

For example, in the context of a manufacturing process, optimization process 212 may respond to an upset condition in a sub-process by recommending utilization of stored byproducts during the course of the upset, and then attempting to build inventory back to its pre-upset values once the affected sub-process has recovered.

Optimization process 212 may also be restarted based on degradation of optimization solution quality. For example, a deviation between the realized output of a sub-process when a recommended set point is used and the expected output estimated by the regression model may be monitored. In one embodiment, a threshold determined by historical sub-process behavior is set to identify when the deviation is too large and the regression model needs to be either retrained or to recognize that the operating mode of the sub-process has changed, and hence a new set of constraints based on an alternate pre-trained regression model ought to be used. In other words, a growing deviation between the recommended set point and the target set point may be indicative of a sub-optimal solution of optimization process 212.

In some cases, optimization process 212 may not be able to find an integer solution (upper bound) for a given minimization objective. In one example, this may be due to hard constraints on the allowed deviation of the sub-process or process operating mode from the target operating mode trajectory. To resolve this issue, the operating mode deviation that provides the smallest increase to a cost function may be chosen for relaxation.

Optimization process 212 may also be restarted based on the expiration of a predetermined time interval (e.g., every 12 hours). Such periodic re-optimizations may avoid optimization results degrading over time with slowly changing conditions that are not significant enough over short intervals to trigger a condition-based re-optimization.

In some embodiments, an optimization model, such as produced by optimization process 212, may be represented by a directed acyclic graph. In such a graph, the edges represent inflow and outflow rates over time-periods and may form the main decision or control variables that determine a level of production of the modeled process. In particular, the predicted output(s) from one or more upstream sub-processes are inputs to one or more downstream sub-processes. If the sub-processes are separated by a inventory or flow buffer, the inputs into the downstream sub-process(es) may be treated as control variables.

Each node in the acyclic graph may represent a sub-process associated with a regression model (e.g., from prediction models 206), which forms an equality constraint in each time-period to capture a node's inflow-outflow relationship. In some embodiments, the regression model chosen for each node may be based on an operating mode determined at 210.

Nodes in the acyclic graph may also represent inventory buffers or storage, such as tanks. Since these nodes do not represent a sub-process, they are not associated with a regression model. Instead, these nodes may be associated with flow conservation constraints, such as a constraints that ensure that the outflow from these nodes is upper bounded by the inflow into the nodes and the inventory build-up.

In some embodiments, an output of optimization process 212, or a model produced by optimization process 212, is an optimal operating mode trajectory 214. The optimal operating mode trajectory 214 data, as well as data resulting from implementation of optimal set-points associated with the optimal mode trajectory, may be stored for modeling of new regression models and re-training of existing regression models by prediction modelling process 204.

Figure 4:
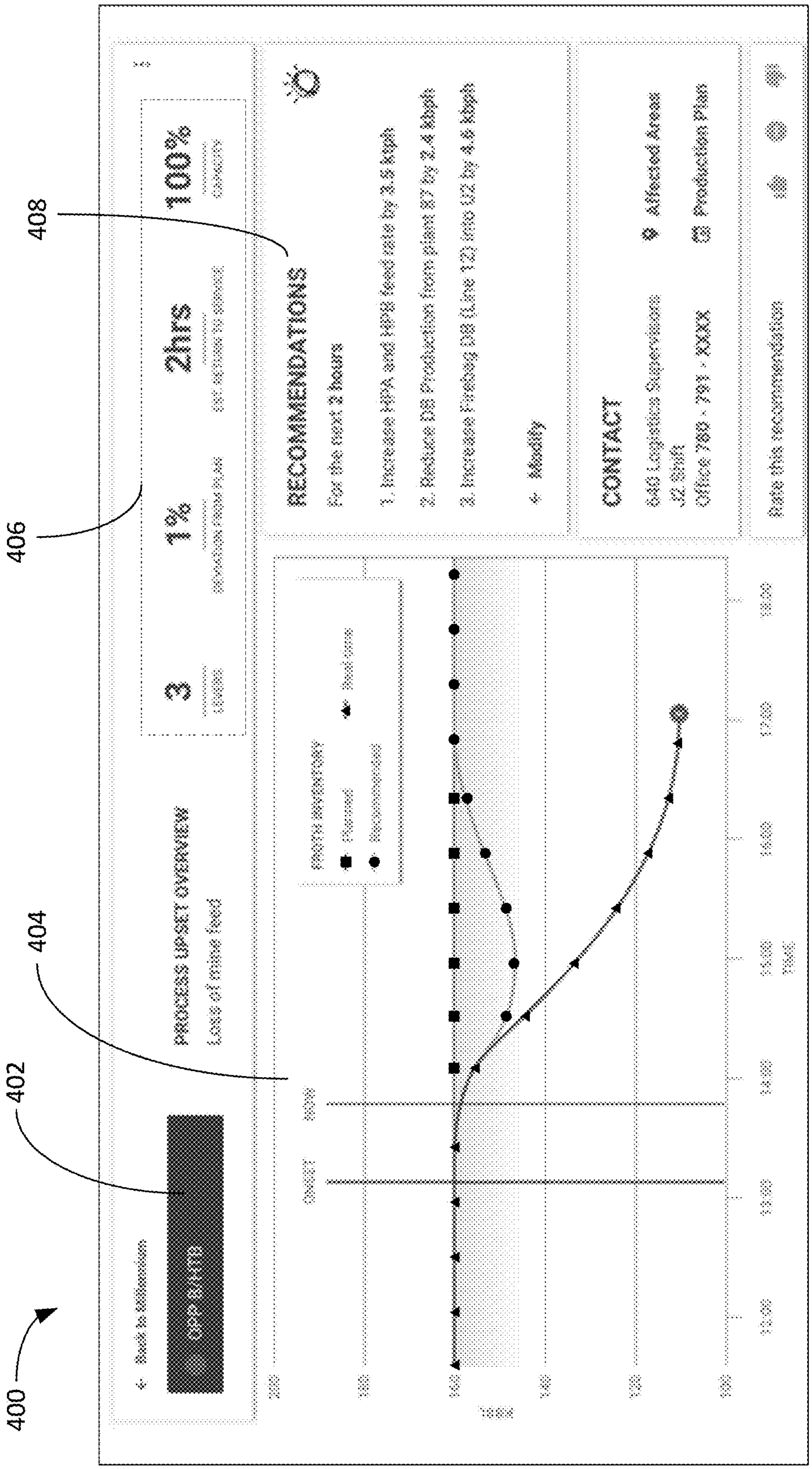
FIG. 4 depicts an example of a set point trajectory recommendation.

In some embodiments, optimal operating mode trajectory 214 is used to determine set point trajectory recommendations. FIG. 4, depicts an example of a set point trajectory recommendation based on an optimal operating mode trajectory (e.g., 214). In other embodiments, a set point trajectory may be in the form of an automatic process control command, which changes set points for sub-processes of a process (e.g., as described in FIG. 1) to implement the optimal operating mode trajectory 214.

Operating mode trajectory optimization, such as just described, offers real-time data-driven scalable and tractable models, which outperform conventional methods, such as: adaptive optimization of hourly deviation of modes under normal and upset scenarios.

Example Prediction Modeling Scheme

Figure 3:
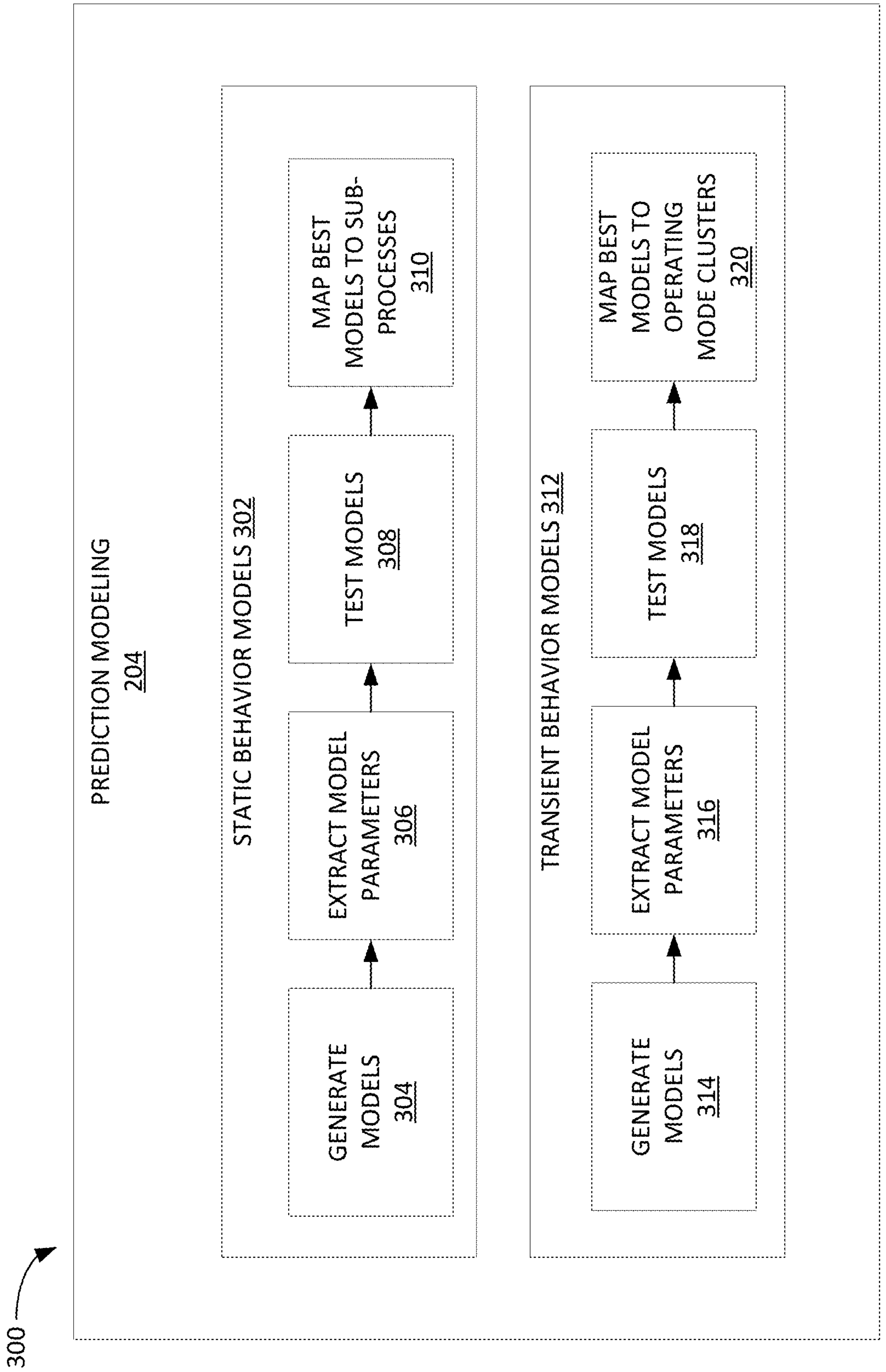
FIG. 3 depicts an example prediction modeling scheme.

FIG. 3 depicts an example prediction modeling scheme 300, which in some embodiments may be implemented for prediction modeling process 204 in FIG. 2.

As described above, prediction modeling 204 may include the generation of both static behavior models 302 and transient behavior models 304 associated with sub-processes and, in some cases, operating modes for sub-processes. When the static behavior models 302 and transient behavior models 304 are generated in advance of any optimization, they may be referred to as pre-processed models.

Static behavior models 302 may be generated at step 304. For example, different static behavior models may be generated for each sub-process of a process. Further, different static behavior models may be generated for each operating mode of a given sub-process. In some embodiments, the static behavior models may comprise regression trees, multivariate adaptive regression splines (MARS), simple linear regressions, and other types of regression models.

After generating the static behavior models, static behavior model parameters may be extracted at step 306. For example, variable coefficients, intercepts, hinge information, and other model parameters may be extracted from the trained static behavior models. In some embodiments, the extracted model parameters may be stored in a tabular format, such as in a database. In some embodiments, the model parameters are stored in JavaScript Object Notation (JSON) format to be used by an optimization process, such as 212 in FIG. 2. In other embodiments, the model parameters may be stored in other data interchange formats. In some embodiments, the model parameters may be ingested as data for future modeling processes, such as in step 202 of FIG. 2.

The static behavior models may be tested at step 308. For example, each model may be tested for its predictive performance with respect to a sub-process using a performance metric, such as, for example: root mean squared error, mean absolute error, R-squared, adjusted R-squared, F-test, and others.

At step 310, the static behavior models may be mapped to sub-processes (and operating modes) based on model performance. For example, a first model of a first type may be selected for a first sub-process based on having the best performance metric of all the tested models for the first sub-process, and a second model of a second type may be selected for a second sub-process based on having the best performance metric of all the tested models for the second sub-process.

In some embodiments, a static behavior model may be a piecewise linear model.

Transient behavior models 312 may be pre-processed in a similar fashion. For example, transient behavior models 312 may be initially generated at step 314. As above, different transient behavior models may be generated for each sub-process of a process. Further, different transient behavior models may be generated for each operating mode of a given sub-process. In some embodiments, the static behavior models may comprise neural network mode, such as a long short-term memory (LSTM) recurrent neural network (RNN), or other types of models.

After generating the transient behavior models, transient behavior model parameters may be extracted at step 316. For example, weights, derivative information, and others be extracted from the trained transient behavior models. In some embodiments, as above, the extracted model parameters may be stored in a tabular format, such as in a database. In some embodiments, the model parameters are stored in JSON format to be used by an optimization process, such as 212 in FIG. 2. In other embodiments, the model parameters may be stored in other data interchange formats. In some embodiments, the model parameters may be ingested as data for future modeling processes, such as in step 202 of FIG. 2.

The transient behavior models may be tested at step 318. For example, each transient behavior model may be tested for its predictive performance with respect to a sub-process (and operating mode) using a performance metric, such as, for example: root mean squared error, mean absolute error, R-squared, adjusted R-squared, F-test, and others.

At step 320, the transient behavior models may be mapped to operating mode clusters based on model performance. For example, a first model of a first type may be selected for a first operating mode cluster based on having the best performance metric of all the tested models for the first sub-process in a particular operating mode, and a second model of a second type may be selected for a second operating mode cluster based on having the best performance metric of all the tested models for the second sub-process in a particular operating mode.

In some embodiments, operating mode clusters are clusters of vectors representing set-points for the same operating mode since many combinations of set-points may be possible for a single operating mode.

Thus, for each sub-process, a library of models may be built, including models trained based on different prediction techniques (regression tree, MARS, simple linear regression, etc.) at several time instances, and models associated with different operating modes. At run-time, for example during optimization process 212 of FIG. 2, the "best" model for a sub-process is the one that minimizes an error metric of choice, such as mean square error, given values for all observed variables. As above, the chosen model may be represented as a dynamic constraint within an optimization model.

FIG. 4 depicts an example of a set point trajectory recommendation 400, such as described with respect to FIG. 2.

Figure 6:
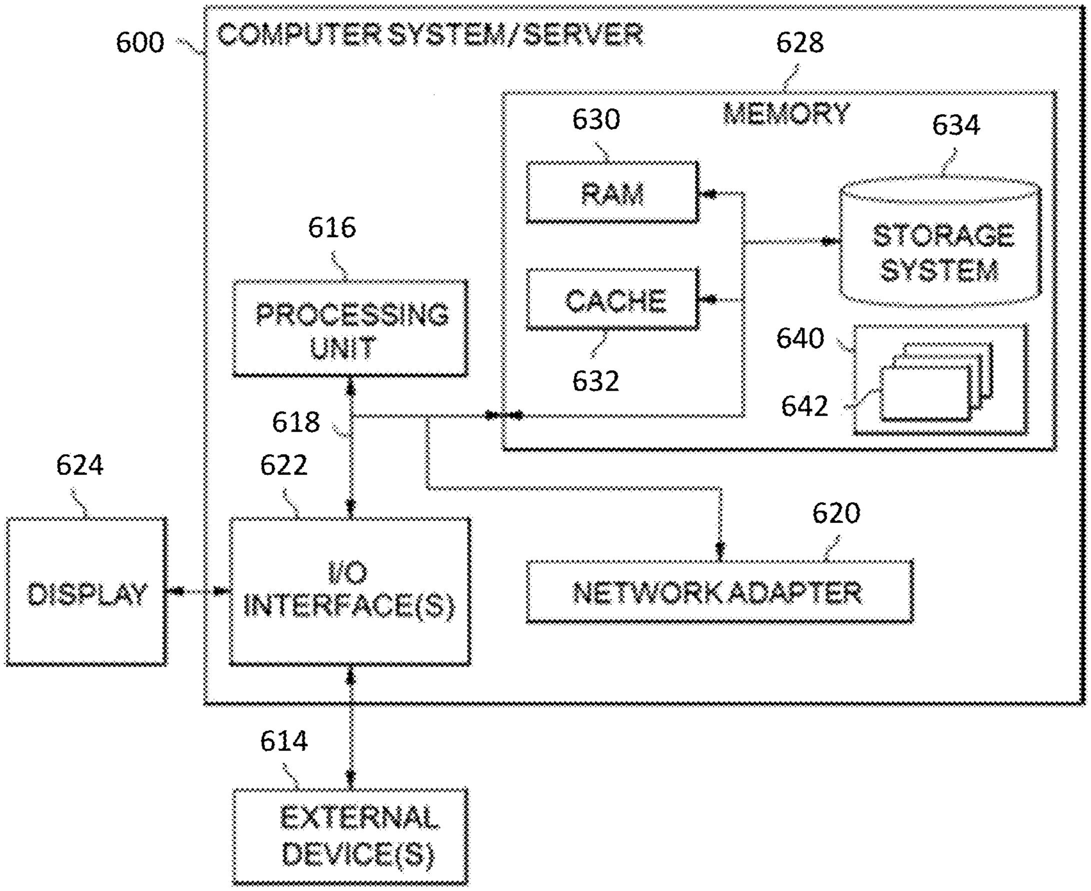
FIG. 6 depicts an example processing system.

In this embodiment, set point trajectory recommendation 400 is presented in a graphical user interface, which may be provided in a web-based application running on a processing system, such as 600 in FIG. 6, or by a native application installed on a processing system, such as 600 in FIG. 6.

Set point trajectory recommendation 400 includes a status indicator element 402, which notes in this example a process upset.

Set point trajectory recommendation 400 also includes a graph element 404 with time indicators for the onset of the upset and the current time. Further, the graph element 404 includes three plotted lines: a first for a planned behavior of the process output, a second for the observed behavior of the process output, including a forward looking prediction portion, and a third for a behavior of the process output that is predicted based on a the set-point recommendation 408. The predicted portions of graph element 404 may be based on models embedded in a prediction-optimization framework, such as those described above with respect to FIGS. 2 and 3.

Set point trajectory recommendation 400 also includes a summary element 406 that includes an indicated number of "levers" (e.g., adjustable parameters that may affect the current process), an estimated deviation from the overall plan, an estimated time to return to planned service, and a process capacity.

Set point trajectory recommendation 400 also includes a recommendations element 408, which includes recommendations based on an optimization process, such as optimization process 212 described above with respect to FIG. 2.

Figure 5:
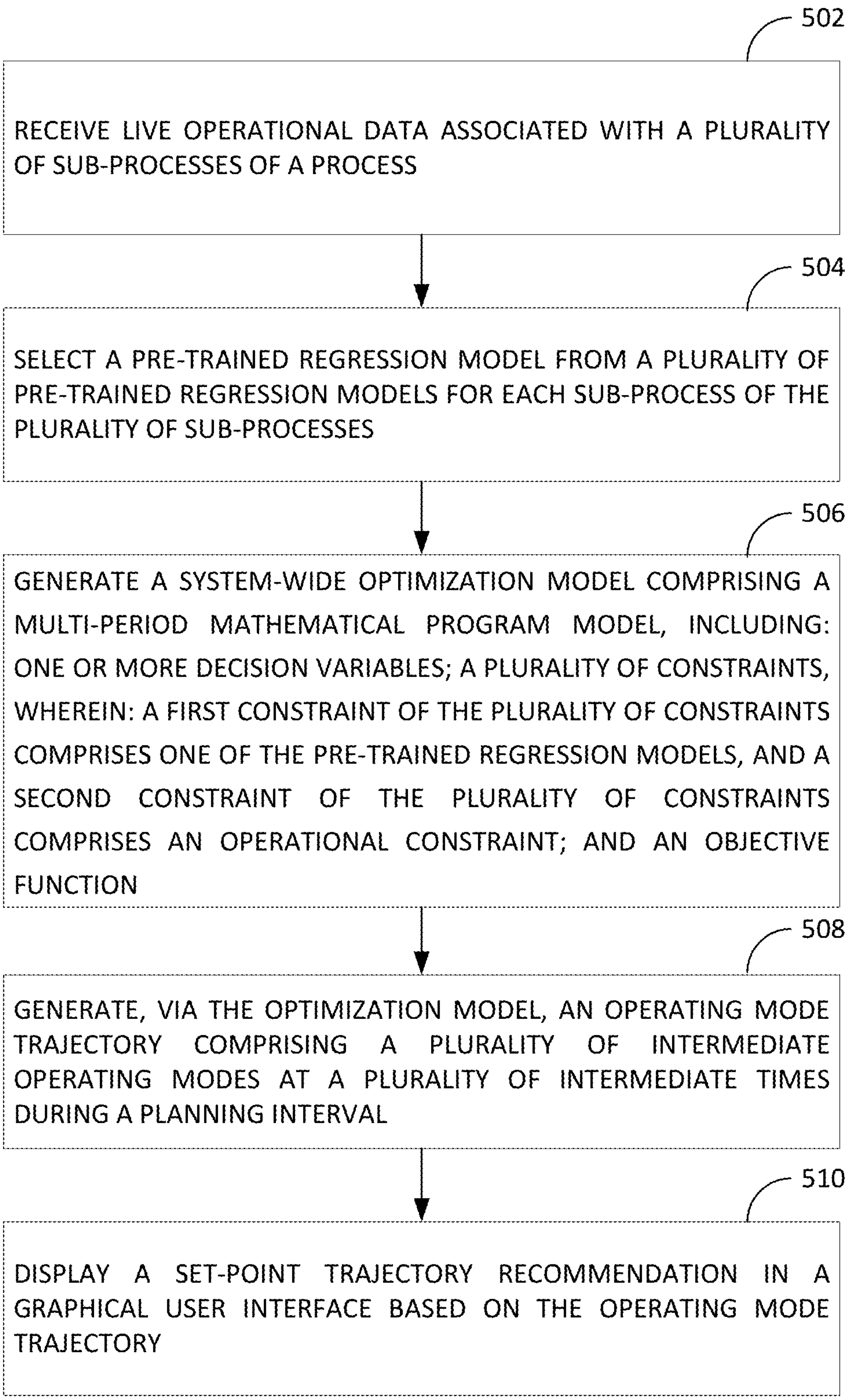
FIG. 5 depicts an example method for optimizing a process.

FIG. 5 depicts an example method 500 for performing process optimization.

Method 500 begins at step 502 with receiving live operational data associated with a plurality of sub-processes of a process.

Method 500 then proceeds to step 504 with selecting a pre-trained regression model from a plurality of pre-trained regression models for each sub-process of the plurality of sub-processes.

Method 500 then proceeds to step 506 with generating a system-wide optimization model comprising a multi-period mathematical program model, including: one or more decision variables; a plurality of constraints, wherein: a first constraint of the plurality of constraints comprises one of the pre-trained regression models, and a second constraint of the plurality of constraints comprises an operational constraint; and an objective function.

In some embodiments, the operational constraint may relate to an inventory control, a threshold on a set point variable, a thresholds on temporal deviations for some or all set point variables, a conservation constraint, an equality constraint, and others.

In some embodiments, the objective function may be a single objective function, or a multi-objective function.

Method 500 then proceeds to step 508 with generating, via the optimization model, an operating mode trajectory comprising a plurality of intermediate operating modes at a plurality of intermediate times during a planning interval.

Method 500 then proceeds to step 510 with displaying a set-point trajectory recommendation in a graphical user interface based on the operating mode trajectory.

In some embodiments, method 500 further includes determining a current operating mode for the process based on the live operational data, wherein selecting the pre-trained regression model from the plurality of pre-trained regression models for each sub-process of the plurality of sub-processes is based, at least in part, on the current operating mode.

In some embodiments of method 500, the live operational data is received from a plurality of sensors associated with the plurality of sub-processes, such as, for example, described above with respect to FIGS. 1 and 2.

In some embodiments of method 500, the plurality of pre-trained regression models comprises: a first subset of static behavior models; and a second subset of transient behavior models, such as described above with respect to FIG. 3. In some embodiments, each pre-trained regression model of the plurality of pre-trained regression models is associated with an operating mode.

In some embodiments of method 500, a first pre-trained regression model associated with a first sub-process comprises one of: a multivariate adaptive regression splines model, a regression tree model, or a simple linear regression model; and a second pre-trained regression model associated with a second sub-process comprises a long short-term memory (LSTM) neural network model or a generalized recurrent neural network (RNN) model.

In some embodiments, method 500 further includes determining, during the planning interval, a change of condition associated with at least one sub-process of the plurality of sub-processes; selecting an alternate pre-trained regression model from the plurality of pre-trained regression models for the at least one sub-process; and generating, via the optimization model, a revised operating mode trajectory.

In some embodiments, method 500 further includes monitoring set-point trajectory recommendation quality based on a deviation between a realized process output and an estimated process output based on the set-point trajectory recommendation; and retraining at least one pre-trained regression model of the plurality of pre-trained regression models based on the deviation exceeding a threshold.

In some embodiments, method 500 further includes calculating a plurality of error metrics, wherein each respective error metrics of the plurality of error metrics is associated with a unique combination of a sub-process of the plurality of sub-processes and a pre-trained regression model of the plurality of pre-trained regression models, wherein selecting the pre-trained regression model from the plurality of pre-trained regression models for each sub-process of the plurality of sub-processes comprising selecting a sub-process of the plurality of sub-processes and a pre-trained regression model of the plurality of pre-trained regression models having a lowest error metric of the plurality of error metrics.

In some embodiments, method 500 further includes receiving historical time-series process data; deriving a plurality of features from the historical time-series process data; and training a plurality of regression models for each sub-process of the plurality of sub-processes.

In some embodiments of method 500, the operating mode trajectory is generated based on minimizing temporal deviations between operating mode clusters.

FIG. 6 depicts an example processing system 600. Processing system 600 may be configured to implement and/or to perform the methods described herein, such as those described above with respect to FIGS. 2-5.

In some embodiments, processing system 600 may comprise a computer system or a server system, which is operational with numerous other general purpose or special purpose computing system environments or configurations. Examples of well-known computing systems, environments, and/or configurations that may be suitable for use with processing system 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Processing system 600 may be described in the general context of computer system-executable instructions, such as program modules, being executed by a computer system. Generally, program modules may include routines, programs, objects, components, logic, data structures, and so on that perform particular tasks or implement particular abstract data types. Processing system 600 may be implemented in distributed cloud computing environments where tasks are performed by remote processing devices that are linked through a communications network. In a distributed cloud computing environment, program modules may be located in both local and remote computer system storage media including memory storage devices.

In the depicted embodiment, processing system 600 is shown in the form of a general-purpose computing device. The components of processing system 600 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing system 600 may include a variety of computer system readable media. Such media may be any available media that is accessible by processing system 600, and it includes both volatile and non-volatile media, removable and non-removable media.

System memory 628 can include non-transitory computer system readable media in the form of volatile memory, such as random access memory (RAM) 630 and/or cache memory 632. Processing system 600 may further include other removable/non-removable, volatile/non-volatile computer system storage media. By way of example only, storage system 634 can be provided for reading from and writing to a non-removable, non-volatile magnetic media (not shown and typically called a hard disk drive (HDD) or solid state disk drive (SSD)). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Processing system 600 may also communicate with one or more external devices 614 such as a keyboard, a pointing device, a display 624, etc.; one or more devices that enable a user to interact with processing system 600; and/or any devices (e.g., network card, modem, etc.) that enable processing system 600 to communicate with one or more other computing devices. Such communication can occur via input/output (I/O) interfaces 622. Still yet, processing system 600 can communicate with one or more networks such as a local area network (LAN), a general wide area network (WAN), and/or a public network (e.g., the Internet) via network adapter 620. As depicted, network adapter 620 communicates with the other components of processing system 600 via bus 618. It should be understood that although not shown, other hardware and/or software components could be used in conjunction with processing system 600. Examples, include, but are not limited to: microcode, device drivers, redundant processing units, external disk drive arrays, RAID systems, tape drives, and data archival storage systems, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the prediction-optimization framework described herein (e.g., with respect to FIGS. 2-3) could execute on a computing system in the cloud. Optimization methods described herein, such as with respect to FIG. 5, may be performed in the cloud. Further, ingested data, prediction models, optimization models, live data, and optimal operating mode trajectories could be stored in a storage location in the cloud. Further, a user interface associated with the prediction-optimization framework (such as described with respect to FIG. 4) could be hosted in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method for optimizing an industrial process, comprising:

receiving live operational data characterizing the operation of different sets of machinery that perform respective sub-processes of a plurality of sub-processes of the industrial process, the live operational data comprising sensor data from a plurality of sensors associated with the plurality of sub-processes;

generating, for each sub-process of the plurality of sub-processes, a respective plurality of regression models using the live operational data, each of the respective plurality of regression models having a different regression model type;

selecting, for each sub-process of the plurality of sub-processes, a pre-trained regression model from the respective plurality of regression models that has a lowest error metric;

generating a system-wide optimization model as a multi-period mathematical program model comprising:

one or more decision variables;

a plurality of constraints comprising the selected pre-trained regression models, and an operational constraint that limits the one or more decision variables to those values capable of being performed by the process during operation; and an objective function comprising a plurality of weights for each objective of each sub-process and each objective of the process;

generating, via the optimization model, an operating mode trajectory comprising a plurality of intermediate operating modes at a plurality of intermediate times during a planning interval; and displaying a set-point trajectory recommendation in a graphical user interface based on the operating mode trajectory.

2. The method of claim 1, further comprising:

determining a current operating mode for the process based on the live operational data, wherein selecting the pre-trained regression model from the respective plurality of regression models is based, at least in part, on the current operating mode.

3. The method of claim 1, wherein the respective plurality of regression models comprises:

a first subset of static behavior models; and a second subset of transient behavior models, and wherein each of the plurality of pre-trained regression models is associated with a respective operating mode.

4. The method of claim 1, wherein:

a first pre-trained regression model associated with a first sub-process of the plurality of sub-processes comprises one of:

a multivariate adaptive regression splines model, a regression tree model, or a simple linear regression model; and a second pre-trained regression model associated with a second sub-process of the plurality of sub-processes comprises a long short-term memory (LSTM) neural network model or a generalized recurrent neural network (RNN) model.

5. The method of claim 1, further comprising:

determining, during the planning interval, a change of condition associated with at least one sub-process of the plurality of sub-processes;

selecting an alternate pre-trained regression model from the plurality of pre-trained regression models for the at least one sub-process; and generating, via the optimization model, a revised operating mode trajectory.

6. The method of claim 1, further comprising:

monitoring set-point trajectory recommendation quality based on a deviation between a realized process output and an estimated process output based on the set-point trajectory recommendation; and retraining at least one pre-trained regression model of the plurality of pre-trained regression models based on the deviation exceeding a threshold.

7. The method of claim 1, further comprising:

calculating a plurality of error metrics, wherein each error metric of the plurality of error metrics is associated with a unique combination of a sub-process of the plurality of sub-processes and a regression model of the plurality of regression models.

8. The method of claim 1, further comprising:

receiving historical time-series process data;

deriving a plurality of features from the historical time-series process data; and training, for each sub-process of the plurality of sub-processes, a plurality of regression models using the plurality of features.

9. The method of claim 1, wherein the operating mode trajectory is generated based on minimizing temporal deviations between operating mode clusters.

10. A system comprising:

a memory comprising computer-executable instructions; and a processor configured to execute the computer-executable instructions and cause the system to:

receive live operational data characterizing the operation of different sets of machinery that perform respective sub-processes of a plurality of sub-processes of an industrial process, the live operational data comprising sensor data from a plurality of sensors associated with the plurality of sub-processes;

generate, for each sub-process of the plurality of sub-processes, a respective plurality of regression models using the live operational data, each of the respective plurality of regression models having a different regression model type;

select, for each sub-process of the plurality of sub-processes, a pre-trained regression model from the respective plurality of regression models that has a lowest error metric;

generate a system-wide optimization model as a multi-period mathematical program model comprising:

one or more decision variables;

a plurality of constraints comprising the selected pre-trained regression models, and an operational constraint that limits the one or more decision variables to those values capable of being performed by the process during operation; and an objective function comprising a plurality of weights for each objective of each sub-process and each objective of the process;

generate, via the optimization model, an operating mode trajectory comprising a plurality of intermediate operating modes at a plurality of intermediate times during a planning interval; and display a set-point trajectory recommendation in a graphical user interface based on the operating mode trajectory.

11. The system of claim 10, wherein the processor is further configured to cause the system to:

determine a current operating mode for the process based on the live operational data; and select the pre-trained regression model from the respective plurality of regression models based, at least in part, on the current operating mode.

12. The system of claim 10, wherein:

the respective plurality of regression models comprises:

a first subset of static behavior models; and a second subset of transient behavior models, and each of the plurality of pre-trained regression models is associated with a respective operating mode.

13. The system of claim 10, wherein the processor is further configured to cause the system to:

determine, during the planning interval, a change of condition associated with at least one sub-process of the plurality of sub-processes;

select an alternate pre-trained regression model from the plurality of pre-trained regression models for the at least one sub-process; and generate, via the optimization model, a revised operating mode trajectory.

14. The system of claim 10, wherein the processor is further configured to cause the system to:

monitor set-point trajectory recommendation quality based on a deviation between a realized process output and an estimated process output based on the set-point trajectory recommendation; and retrain at least one pre-trained regression model of the plurality of pre-trained regression models based on the deviation exceeding a threshold.

15. A non-transitory computer-readable storage medium comprising computer-readable program code that, when executed by one or more computer processors of a processing system, cause the processing system to perform a method of optimizing an industrial process, the method comprising:

receiving live operational data characterizing the operation of different sets of machinery that perform respective sub-processes of a plurality of sub-processes of the industrial process, the live operational data comprising sensor data from a plurality of sensors associated with the plurality of sub-processes;

generating, for each sub-process of the plurality of sub-processes, a respective plurality of regression models using the live operational data, each of the respective plurality of regression models having a different regression model type;

selecting, for each sub-process of the plurality of sub-processes, a pre-trained regression model from the respective plurality of regression models that has a lowest error metric;

generating a system-wide optimization model as a multi-period mathematical program model comprising:

one or more decision variables;

a plurality of constraints comprising the selected pre-trained regression models, and an operational constraint that limits the one or more decision variables to those values capable of being performed by the process during operation; and an objective function comprising a plurality of weights for each objective of each sub-process and each objective of the process;

generating, via the optimization model, an operating mode trajectory comprising a plurality of intermediate operating modes at a plurality of intermediate times during a planning interval; and displaying a set-point trajectory recommendation in a graphical user interface based on the operating mode trajectory.

16. The non-transitory computer-readable storage medium of claim 15, wherein the method further comprises:

determining a current operating mode for the process based on the live operational data, wherein selecting the pre-trained regression model from the respective plurality of regression models is based, at least in part, on the current operating mode.

17. The non-transitory computer-readable storage medium of claim 15, wherein:

the plurality of regression models comprises:

a first subset of static behavior models; and a second subset of transient behavior models, and each of the plurality of pre-trained regression models is associated with an operating mode.

18. The non-transitory computer-readable storage medium of claim 15, wherein the method further comprises:

determining, during the planning interval, a change of condition associated with at least one sub-process of the plurality of sub-processes;

selecting an alternate pre-trained regression model from the plurality of pre-trained regression models for the at least one sub-process; and generating, via the optimization model, a revised operating mode trajectory.

19. The non-transitory computer-readable storage medium of claim 15, wherein the method further comprises:

monitoring set-point trajectory recommendation quality based on a deviation between a realized process output and an estimated process output based on the set-point trajectory recommendation; and retraining at least one pre-trained regression model of the plurality of pre-trained regression models based on the deviation exceeding a threshold.

20. The method of claim 1, wherein for each sub-process of the plurality of sub-processes, the respective plurality of regression models include regression model types selected from the following:

regression trees, multivariate adaptive regression splines (MARS), linear regressions, segmented or piece-wise linear regressions, nonlinear neural networks, a static linear model, a dynamic linear model, and a nonlinear dynamic model.

* * * * *